(12) United States Patent
Wilson

(10) Patent No.: US 11,787,529 B2
(45) Date of Patent: Oct. 17, 2023

(54) AIRCRAFT LANDING GEAR

(71) Applicant: Airbus Operations Limited, Bristol (GB)

(72) Inventor: Fraser Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/510,117

(22) Filed: Oct. 25, 2021

(65) Prior Publication Data
US 2022/0194565 A1 Jun. 23, 2022

(30) Foreign Application Priority Data
Dec. 21, 2020 (GB) ..................................... 2020247

(51) Int. Cl.
*B64C 25/34* (2006.01)
*B64C 25/10* (2006.01)
*B64C 25/60* (2006.01)
*B64C 25/00* (2006.01)

(52) U.S. Cl.
CPC ............ *B64C 25/34* (2013.01); *B64C 25/001* (2013.01); *B64C 25/10* (2013.01); *B64C 25/60* (2013.01); *B64C 2025/008* (2013.01)

(58) Field of Classification Search
CPC .............................................. B64C 2025/008
See application file for complete search history.

(56) References Cited

U.S. PATENT DOCUMENTS

| | | | |
|---|---|---|---|
| 2,174,315 | A | 9/1939 | Dowty |
| 3,345,019 | A | 10/1967 | Black et al. |
| 4,524,929 | A | 6/1985 | Gebhard |
| 2010/0288878 | A1 | 11/2010 | Bennett |
| 2018/0001999 | A1 | 1/2018 | Page |
| 2020/0207463 | A1 | 7/2020 | Schuster et al. |
| 2020/0207464 | A1* | 7/2020 | Whitlock ................ B64C 25/26 |

FOREIGN PATENT DOCUMENTS

| | | |
|---|---|---|
| EP | 3 722 205 | 10/2020 |
| FR | 3 018 501 | 9/2015 |
| GB | 1 204 213 | 9/1970 |
| GB | 2 101 542 | 1/1983 |

OTHER PUBLICATIONS

Further European Search Report for Application No. GB2020247.9, two pages, dated Dec. 24, 2021.
Extended European Search Report for Application No. EP 21204855.7, eight pages, dated Apr. 7, 2022.
Combined Search and Examination Report for GB Application No. 2020247.9 dated Jun. 14, 2021, 8 pages.

* cited by examiner

*Primary Examiner* — Philip J Bonzell
*Assistant Examiner* — Brendan Kroger Schneider
(74) *Attorney, Agent, or Firm* — Nixon & Vanderhye P.C.

(57) ABSTRACT

An aircraft landing gear is disclosed having a landing gear leg attachable at a first end to an aircraft, and an axle beam, both the landing gear leg and the axle beam being rotatably mounted. The axle beam is rotatable between a first position, in which a first end of the axle beam is a first (shorter) distance from the first end of the landing gear leg, and a second position, in which said first end of the axle beam is a second (longer) distance from the first end of the landing gear leg. A biasing member is configured to be able to bias the axle beam towards the second position. An aircraft, a blended wing body aircraft, and a method of operating an aircraft are also disclosed.

15 Claims, 4 Drawing Sheets

AIRCRAFT LANDING GEAR

CROSS RELATED APPLICATION

This application claims priority to United Kingdom Patent Application GB 2020247.9, filed Dec. 21, 2020, the entire contents of which is hereby incorporated by reference.

BACKGROUND OF THE INVENTION

The present disclosure relates to aircraft landing gear.

The present invention concerns aircraft landing gear. More particularly, but not exclusively, this invention concerns an aircraft landing gear comprising: i) a landing gear leg attachable at a first end to an aircraft, and having a second opposite end, ii) an axle beam having a landing gear wheel axle mounting point at a first end, having a second opposite end and being rotatably mounted at a pivot point between first and second ends of the axle beam towards the second end of the landing gear leg, such that the axle beam is rotatable with respect to the landing gear leg between a first position, in which the first end of the axle beam is a first distance from the first end of the landing gear leg, and a second position, in which the first end of the axle beam is a second distance from the first end of the landing gear leg, the second distance being longer than the first distance, and iii) a biasing member configured to be able to bias the axle beam towards the second position.

The invention also concerns an aircraft, a blended wing body aircraft, and a method of operating an aircraft.

US20180001999A1 describes a landing gear arrangement of a blended wing body aircraft. Systems and methods for mechanically rotating an aircraft about its centre-of-gravity are disclosed, that involve the raising of a nose landing gear, and lowering of a main landing gear. The nose landing gear and main landing gear are shown as being hydraulically linked.

The simultaneous raising and lowering the nose and main landing gears requires use of a relatively complex linked hydraulic system between the two landing gears. In addition, the landing gear appear to be actively controlled (i.e. they need a command input from a pilot).

FIG. 1 shows a side view of a blended wing body aircraft 100 with a pair of landing gear: a nose landing gear (NLG) 101 and a main landing gear (MLG) 102 as described in US20180001999A1. The aircraft described in US20180001999A1 in use actively lifts the nose landing gear 101, and lowers the main landing gear 102, such that the nose 103 of the blended wing body aircraft 100 pivots up.

The nose landing gear 101 and the main landing gear 102 are raised and lowered simultaneously, and thus require complex systems to interact. Additionally, a command function is required at the take-off rotation in order to activate the lifting function.

The present invention seeks to mitigate the above-mentioned problems. Alternatively or additionally, the present invention seeks to provide an improved aircraft landing gear, aircraft, blended wing body aircraft, and method of operating an aircraft.

SUMMARY OF THE INVENTION

The present invention provides, according to a first aspect, an aircraft landing gear comprising: i) a landing gear leg attachable at a first end to an aircraft, and having a second opposite end, ii) an axle beam having a landing gear wheel axle mounting point at a first end, having a second opposite end and being rotatably mounted at a pivot point between first and second ends of the axle beam towards the second end of the landing gear leg, such that the axle beam is rotatable with respect to the landing gear leg between: a first position, in which the first end of the axle beam is a first distance from the first end of the landing gear leg, and a second position, in which the first end of the axle beam is a second distance from the first end of the landing gear leg, the second distance being longer than the first distance, and iii) a biasing member configured to be able to bias the axle beam towards the second position.

The landing gear leg may be an upper landing gear leg. The axle beam may be a lower landing gear leg.

The biasing member provides a biasing force to urge the axle mounting point away from the aircraft attachment point and so effectively lengthens the landing gear between the wheel and the aircraft. This causes the aircraft (at the attachment point between the aircraft and landing gear) to move upwards relative to the ground. If the landing gear is a nose landing gear, this causes the aircraft to pitch up such that the longitudinal axis of the aircraft is angled (further) upwards relative to the ground. This increase in pitch-up angle helps the aircraft take-off. This is especially useful on a blended wing body aircraft where the main landing gear is much further back on the aircraft, than for a conventional commercial passenger aircraft. On such a blended wing body aircraft, the main landing gear (upon which the aircraft effectively rotates for take-off) is much nearer the rear elevators (at the rear of the aircraft) and so the pitch up moment arm distance from the elevators to the main landing gear is much less. This makes it difficult for the aircraft to obtain a required pitch up angle at take-off, for a blended wing body aircraft with conventional landing gear. Having a nose landing gear that urges the nose of the aircraft upwards, aids this take-off rotation.

The rotation action of such an arrangement is able to be automatic and so does not require any switch or control setting to be changed during take-off in order to provide the additional pitch angle. In addition to being convenient, this is particularly beneficial for certification reasons, as it is not permitted for a control setting to be required to be changed during the take-off procedure (i.e. after a take-off run down a runway is commenced).

Preferably, the biasing member is biased to extend to increase the distance between a first and a second opposite end of the biasing member and so increase the distance between the first end of the axle beam and the first end of the landing gear leg.

Preferably, the biasing member comprises an elongate member connected at a first end to the axle beam and at a second opposite end to the landing gear leg. The biasing member may be directly, or indirectly connected to either of the landing gear leg or the axle beam.

The biasing member may be indirectly connected to landing gear leg.

The biasing member may be attached towards the first end of the axle beam. The biasing member may be attached towards the first end of the landing gear leg, i.e. near to an attachment point on an aircraft such that if this point of the aircraft lifts up, so does the first end of the landing gear leg and thus so does the first end of the biasing member. This provides the biasing member the space to extend.

Preferably, the biasing member is pivotally connected at one or both of the first and second ends (of the biasing member). This allows the required movement (in other words the necessary range of motion to function) of the landing gear leg, axle beam and biasing member.

Preferably, the biasing member is indirectly connected to the landing gear leg via a brace member extending between the axle beam and the landing gear leg.

The biasing member may be indirectly connected to a second end of the axle beam via a (the) brace member extending between the axle beam and the landing gear leg.

Preferably, the brace member is pivotally connected to the axle beam.

The brace member may be fixedly connected at a first end of the brace member to the landing gear leg. The brace member may be pivotally connected at its second opposite end to the second end of the axle beam.

Preferably, the biasing member comprises a telescopic arm with a first section and a second section able to telescope in relation to each other. Alternatively, or additionally, the biasing member may comprise a spring, or a series of interconnected springs.

Preferably, the telescopic arm is provided with a fluid pressurisation system for urging telescoping movement of the first and second sections.

The fluid may be a liquid—i.e. such that the biasing member comprises a hydraulic cylinder. Alternatively or additionally, the fluid may be gas—i.e. such that the biasing member comprises a pneumatic cylinder. The fluid pressurization system may function in conjunction with a spring, or a series of interconnected springs.

Preferably, the fluid pressurisation system comprises a control valve arrangement with a pressurisation setting in which the first and second sections of the telescopic arm are urged apart to lengthen the arm. In use, the control valve arrangement can be put in this first position and thereby urge the telescopic arm to increase the distance between the second end of the axle beam and the first end of the landing gear leg. This results in a lengthening of the landing gear.

Preferably, the control valve arrangement has a locking setting in which the relative telescopic position of the first and second sections of the telescopic arm is locked. In this setting, the telescopic arm retains the length it was previously at prior to this setting being selected, without unnecessarily bleeding fluid. This setting could be used during flight, where the relative telescopic position of the first and second sections of the telescopic arm does not need to be changed. This setting also allows the telescopic arm to be locked in the extended position and so ensure the length of the landing gear is longer. If the landing gear is the nose landing gear, locking the telescopic arm in the extended position keeps the aircraft incidence angle high when on the ground, and so provides aerodynamic braking (because there is more drag) after landing. This is especially useful for aircraft speeds above about 50 knots. Once the aircraft speed has dropped (for example, to about 50 knots), aerodynamic braking is less effective and so the control valve arrangement could be moved from the locking setting. This would allow the landing gear to gradually shorten, as the biasing member shortens.

Preferably, the control valve arrangement has a released setting in which there is (substantially) no biasing of the telescoping movement of the first and second sections of the telescopic arm. With the control valve arrangement in this position, the telescopic arm is permitted to shorten. In this setting, there is substantially no pressurisation of the telescopic arm. Once the aircraft speed has dropped (for example, to about 50 knots), aerodynamic braking is less effective and so the control valve arrangement could be moved from the locking setting to this released setting, allowing the landing gear to shorten.

Preferably, the landing gear leg or the axle beam is telescopic such that it can extend. This means that, as the aircraft lifts up, the landing gear leg or the axle beam can extend.

The landing gear leg may be telescopic. This means that it can start to extend as soon as aircraft starts lifting up during take-off. In effect, this provides a further mode in which the landing gear can extend in length, in addition to the aforementioned rotational action. Therefore, the landing gear has two modes of extension that allow the part of the aircraft to which the first end landing gear leg is attached to be raised. For every unit of distance the aircraft lifts, the first landing gear can extend by the same amount. Thus, the first aircraft landing gear leg being telescopic helps the nose to pitch up during take-off. The landing gear leg being telescopic also allows it to provide a suspension function or effect during taxi, take-off and/or landing.

Preferably, the landing gear is a nose landing gear. For example, the landing gear may be a nose landing gear that has only one axis about which the nose wheels rotate along the ground, e.g. a single wheel or two or more wheels that all share an axle axis.

The nose landing gear may comprise a steering system. The steering system of the nose landing gear may be capable of providing a range of rotational steering movement through at least 60 degrees.

The nose landing gear may comprise a braking system. The braking system may be a "rack and pinion" braking system. Alternatively or additionally, the braking system may be one or more of several other different mechanisms such as a "push pull", "rotary actuator", or "banana link" braking system.

According to a second aspect of the invention there is also provided an aircraft comprising the landing gear as described above. The landing gear may be retractable into a landing gear bay in the aircraft. This may be achieved through a retraction mechanism, which can actuate the landing gear to pivot about the attachment point of the first end of the first leg, such that the landing gear can rotate into the aircraft. The landing gear may be the nose landing gear of the aircraft.

The aircraft may also comprise a main landing gear. The main landing gear may be substantially similar to the nose landing gear, and comprise a relatively large number of similar components of the nose landing gear. The lower landing gear leg of the main landing gear and the lower landing gear leg of the nose landing gear may share common forgings, for example. However, the main landing gear may not comprise a biasing member and/or may not be attached to a fluid pressurisation system.

The main landing gear and the nose landing gear may share a substantial number of common components. For example, the components of the landing gear leg and axle beam may be substantially the same. This may be possible because the basic vertical loads on both the near landing gear and main landing gear may be substantially the same. This is because the aircraft weight can be more evenly balanced over the nose and main landing gears due to the fact that the main landing gear is further aft on the aircraft for a blended wing body aircraft. For example, the pivotable connections between the landing gear leg and axle beam may use the same fittings on both the nose landing gear and main landing gear. The retraction mechanism may also be substantially the same for both the nose landing gear and the main landing gear. The axle mounting point of the axle beam and the braking system may be of a common design on both the nose landing gear and main landing gear. This has significant advantages in terms of the cost of manufacturing the components for both the main and nose landing gear and improves the availability of spare parts for either landing gear.

According to a third aspect of the invention there is also provided a blended wing body aircraft comprising the landing gear as described above.

Preferably, the landing gear is a nose landing gear, wherein there is also a main landing gear that is situated at a position rear of aircraft fuel tanks and/or rear of the area of the aircraft in which passengers would be located. For example, the main landing gear may be at a relatively high length along the length of the mean aerodynamic chord (MAC).

The main landing gear is optionally at least 55% along the MAC, optionally at least 70% along the MAC and optionally at least 85% along the MAC. The main landing gear may be located at a location from 55% to 95% along the MAC, optionally from 65% to 90% along the MAC, and optionally from 75% to 85% along the MAC.

In the first position, the axle beam of the nose landing gear may be in a substantially horizontal position. In the second position, the axle beam of the nose landing gear may extend downwardly. In other words, in the second position the axle beam of the nose landing gear may extend towards the vertical (relative to the ground).

According to a fourth aspect of the invention, there is provided a method of operating an aircraft, the aircraft comprising a landing gear, the method comprising the steps of: i) while the aircraft is on the ground, moving a control valve arrangement to a pressurised setting, to cause a landing gear leg of the landing gear to be biased to rotate to extend the height of the landing gear, ii) during take-off, lifting the nose of the aircraft up, thereby automatically causing the landing gear leg to rotate to extend the height of the landing gear.

The method provides an automatic way of increasing pitch angle of aircraft upon take-off. The automatic way of increasing the pitch angle upon take of is actuated through use of a passive system.

According to a fifth aspect of the invention, there is provided a method of operating an aircraft, the aircraft comprising a landing gear, the method comprising the steps of: i) while the aircraft is in the air, moving a control valve arrangement to a locked setting, to cause a landing gear leg of the landing gear to be locked in a rotation position in which the landing gear height is extended, ii) after landing, moving the control valve arrangement to a released setting, to cause the landing gear leg to rotate to reduce the height of the landing gear.

The method may include the step of keeping the nose of the aircraft lifted after landing, so it remains at a high incidence, therefore causes higher drag (compared a nose that is not lifted) and thereby aids aircraft braking. This braking effect results in less wear of the brakes. The brakes wearing more slowly results in them needing to be replaced less often. This reduces the cost of running the aircraft. Aircraft landing gear brakes usually comprise carbon brake disks. An air braking action such as this therefore also has an environmental benefit, because it results in the carbon brakes being replaced (and therefore manufactured) less often.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
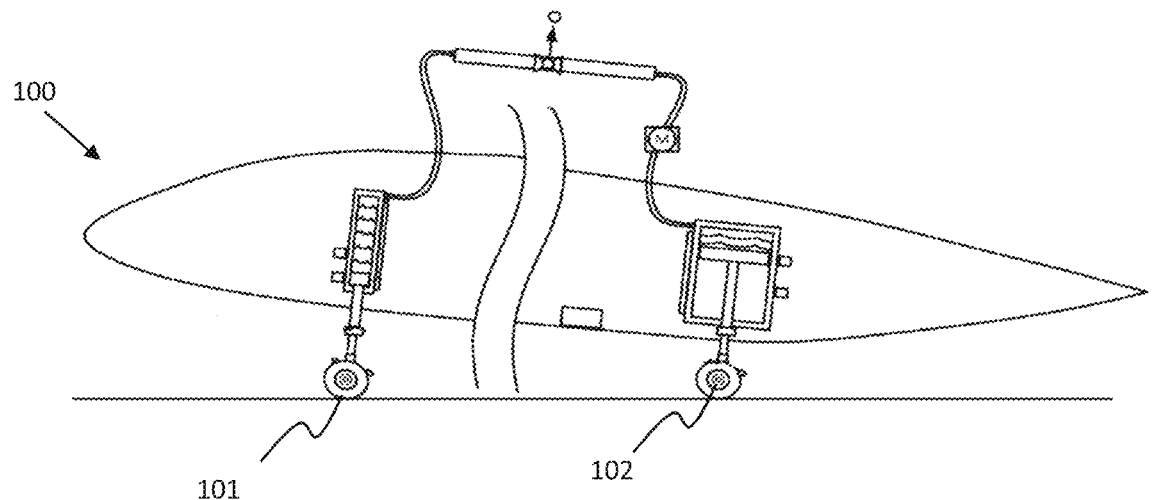
FIG. 1 shows a side view of a prior art blended wing body aircraft.
Figure 2:
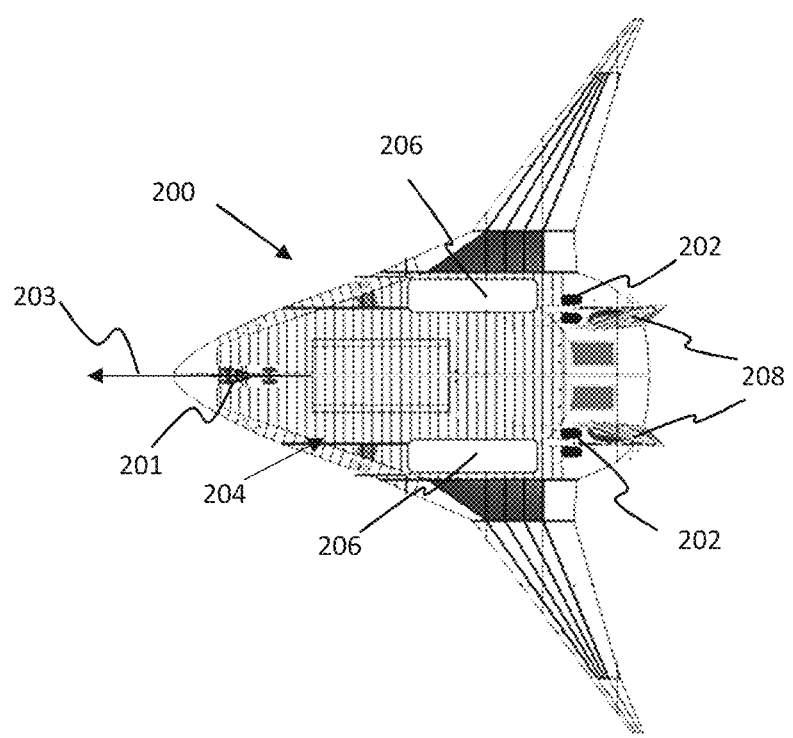
FIG. 2 shows a plan view of a blended wing body aircraft according to a first embodiment of the invention.

FIG. 2 shows a plan view of a blended wing body aircraft 200 comprising a nose landing gear 201 and a main landing gear 202 according to a first embodiment of the invention. Both the nose landing gear 201 and the main landing gear 202 are arranged symmetrically about a longitudinal axis of the aircraft 200 on which they are mounted. The nose landing gear 201 is a single landing gear substantially in-line with the longitudinal axis, and the main landing gear 202 is a pair of landing gear arranged symmetrically around the longitudinal axis of the aircraft (i.e. there is one landing gear of the pair on each side of the longitudinal axis). A forwards arrow 203 is shown on that longitudinal axis, indicating the forwards direction of the aircraft.

Each of the main landing gear 202 have two wheels. The main landing gear 202 are mounted to the underside of the aircraft fuselage. They are positioned aft of passenger area 204 and aft of a pair of fuel tanks 206. This position is at around 80% along the mean aircraft chord (MAC). The main landing gear 202 are positioned aft of the centre of gravity of the aircraft (not shown).

The nose landing 201 is mounted to the underside of the aircraft fuselage. The nose landing gear is retractable, and is shown as being retracted in FIG. 2. In other words, the nose landing gear 202 can be stored, i.e. it is stowable and can be retracted into the fuselage of the aircraft 200, such that, when stowed, no part of the nose landing gear 202 extends below the fuselage of the aircraft 200. The nose landing gear 201 has two wheels, and can be driven by a steering mechanism (not shown in FIG. 2). The nose landing gear 201 also has a braking system (not shown in FIG. 2).

The nose landing gear 201 and main landing gear 202 share many common components. This is possible because of the similar scale of vertical loads experienced by the nose landing gear 201 and main landing gear 202, due to their relative locations to the centre of gravity of the aircraft.

The main landing gear 202 are positioned fore of the elevators 208. The moment about the main landing gear 202, from the elevators 208 to the centre of gravity of the aircraft 200, is 1:1.5 (to the nearest 0.5). In other words, the distance between the elevators 208, and the main landing gear 202, is approximately 1.5 times the distance from the main landing gear 202 to the centre of gravity of the aircraft 200.

The aircraft 200 is 30 metres long. The centre of the main landing gear 202 are located 24 metres aft of the front of the aircraft 200. The distance between the centre of the main landing gear 202 and the centre of the elevators 208 is 4.5 metres. The centre nose landing gear 201 is located at a distance of 6 metres from the front of the aircraft 200.

Figure 3A:
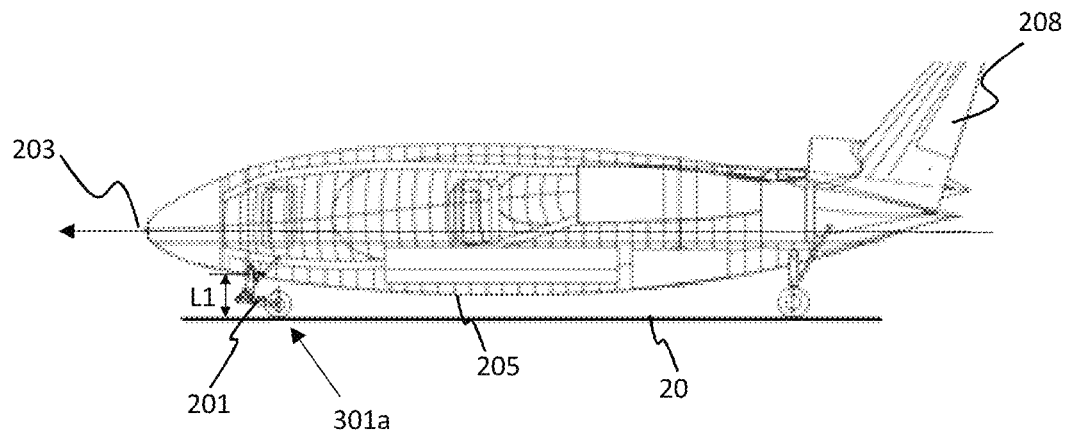
FIG. 3a shows a side view of the blended wing body aircraft of FIG. 2.
Figure 3B:
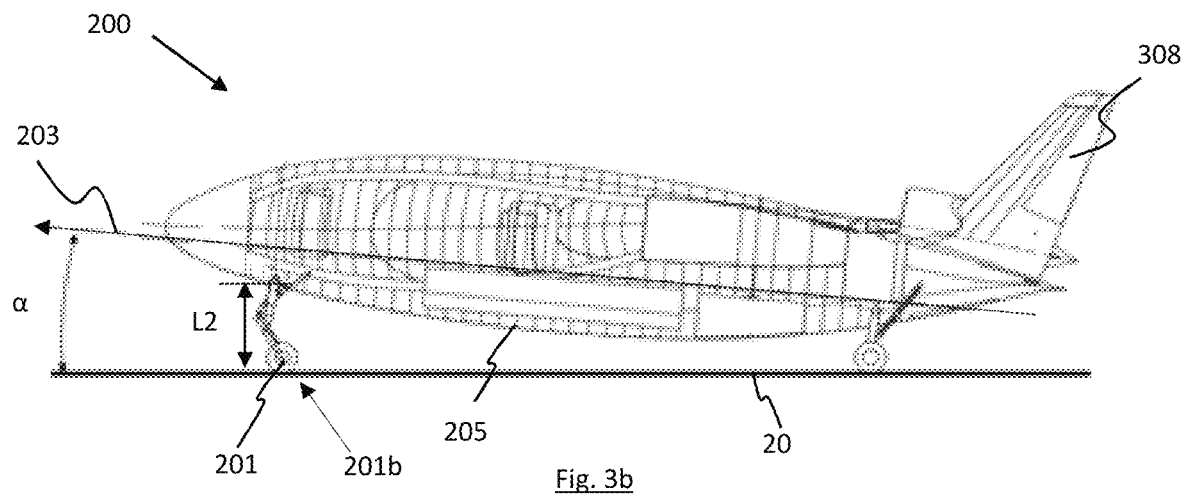
FIG. 3b shows a side view of the blended wing body aircraft of FIG. 2, where the nose landing gear is in an extended position.

FIGS. 3a and 3b each show a side view of shows a side view of the blended wing body aircraft of FIG. 2. The blended wing body aircraft of FIG. 2 will now be described in more detail.

In FIG. 3a, the nose landing gear 201 is in a first configuration 201a. In this first configuration 201a of the landing gear, the longitudinal axis 203 of the aircraft 200 is substantially parallel with the ground. In the first configuration 201a, the nose landing gear 201 has a first vertical height L1 from the ground, which is the height measured from the ground 20 to the point where the nose landing gear 201 meets the underside 205 of the fuselage of the aircraft. The first vertical height L1 is approximately 3.5 metres. The first configuration is the configuration that is suitable for use when the aircraft 200 is at rest, for example for loading and unloading.

In FIG. 3b, the nose landing gear 201 is in a second configuration 201b. In this second configuration 201b of the landing gear, the longitudinal axis 203 of the aircraft 200 is at an angle α from the ground. The angle α away from the ground at which the longitudinal axis 203 of the aircraft 200 is oriented is 5.5° In the second configuration 201b, the nose landing gear 201 has a second vertical height L2 from the ground, which is the height measured from the ground 20 to the point where the nose landing gear 201 meets the underside 205 of the fuselage of the aircraft. The second vertical height L2 is greater than the first vertical height L1. The second vertical height L2 is approximately 5 metres.

When the aircraft 200 is stationary on the ground 20, or moving at a low speed along the ground (such as a taxiing speed) the nose landing gear is in the first configuration 201a. The second configuration 201b is the configuration that the aircraft 200 will transition to during take-off. The transition between the first configuration 201a and the second configuration 201b is automatic. By this, what is meant is that the transition does not require any switch or control setting to be changed during taxi or take-off (either by the pilot, or by a computer system or the like). The transition occurs through the use of passive hydraulic actuation system, such as that described in FIG. 6.

Figure 4A:
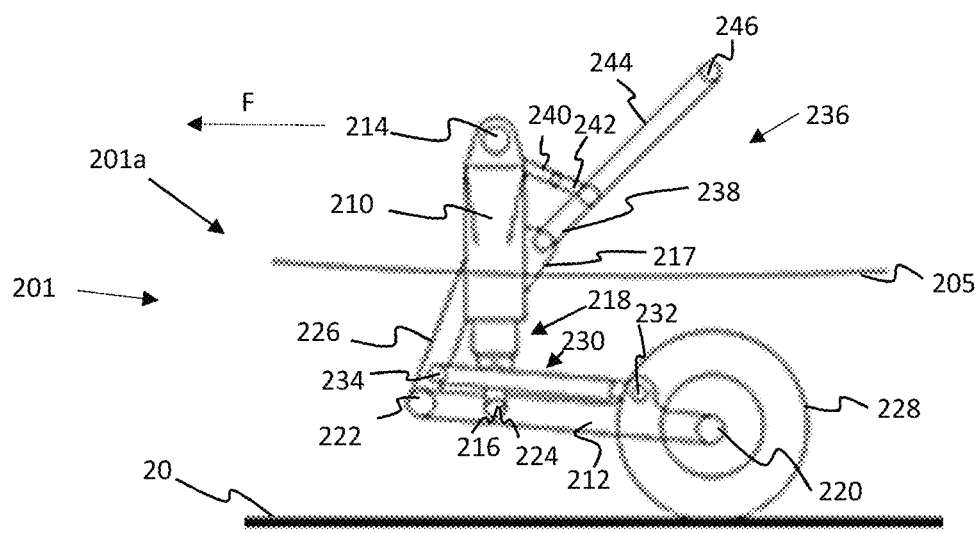
FIG. 4a shows a side view of the nose landing gear of FIG. 2, with the landing gear in a retracted position.
Figure 4B:
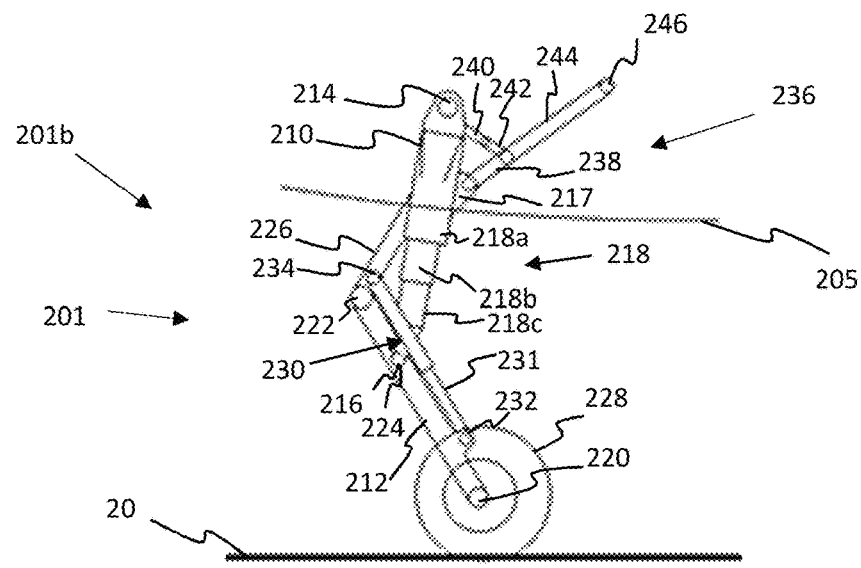
FIG. 4b shows a side view of the nose landing gear of FIG. 2, where the landing gear is in the extended position.
Figure 4C:
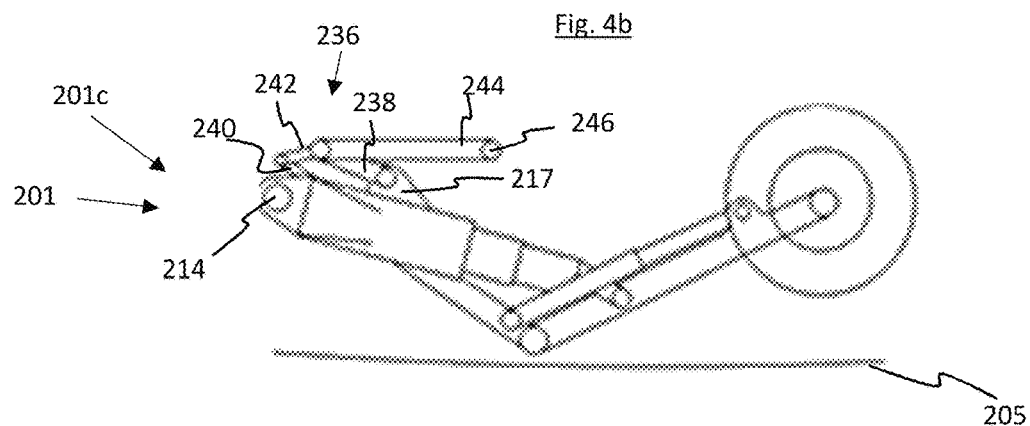
FIG. 4c shows a side view of the nose landing gear of FIG. 2, where the landing gear is in a stowed position.

FIGS. 4a, 4b and 4c each show a side view of the nose landing gear of FIG. 2. These Figures show the landing gear of the first embodiment in greater detail and the same reference numerals are used to refer to like elements. The landing gear will now be described in more detail.

FIG. 4a shows a landing gear in a first configuration 201a. The landing gear has an upper landing gear leg 210, and a lower landing gear leg 212. The landing gear is attached to the underside 205 of an aircraft fuselage. The fore direction of the landing gear F is also shown.

The upper landing gear leg 210 has an upper end 214 for connecting the landing gear to an underside 205 of an aircraft fuselage. The upper landing gear leg 210 is pivotable around the upper end 214 to allow stowage into a landing gear bay. The upper landing gear leg 210 has a second end 216, opposite and distal to the upper end 214.

The upper landing gear leg 210 is also attached to a landing gear stowage mechanism 236. The landing gear stowage mechanism 236 consists of four pivotally connected levers: a dragstay lower lever 238, lockstay upper lever 240, lockstay lower lever 242, and dragstay upper lever 244. The dragstay lower lever 238 is pivotally connected to the second bracket 217. The lockstay upper lever 240 is pivotally connected to the upper landing gear leg 210. The dragstay upper lever 244 is pivotally connected to both the dragstay lower lever 238 and the lockstay lower lever 242, and is pivotally connectable at a distal end 246 to an aircraft. In both FIGS. 4a and 4b, the landing gear stowage mechanism 236 is deployed, and thus the landing gear is deployed below the aircraft underside 205 of the aircraft fuselage. When the landing gear stowage mechanism 236 is arranged such that the landing gear is deployed, dragstay lower lever 238 is substantially parallel with dragstay upper lever 244 and lockstay upper lever 240 is substantially parallel with lockstay lower lever 242. The landing gear stowage mechanism 236 is pivotally attached to the aircraft by the dragstay upper lever 244 at its distal end 246.

Fixedly mounted to the upper landing gear leg 210 is a bracket 217 that is also fixed relative to the upper end 214 of the upper landing gear leg 210. In other words, should the upper landing gear leg 210 be rotated about its upper end 214, the bracket 217 would rotate with it. The bracket 217 is fixed aft of the upper landing gear leg 210.

The lower end 216 the upper landing gear leg 210 is mounted on an extendible mechanism 218, which is made of three telescopic parts, (described in detail in FIG. 4b below). This means that the distance between the upper end 214 of the upper landing gear leg 210, and the lower end 216 of the upper landing gear leg 210 is variable, and may be shortened or lengthened. The extendible mechanism 218 may also act as a shock absorber.

The lower landing gear leg 212 has a first end 220, and second end 222 that is distal to the first end 220. The lower landing gear leg 212 is pivotally connected at a pivot point 224 between its first end 220 and second end 222 to the lower end 216 of the upper landing gear leg 210. Therefore, the first leg 210 and the second leg 212 can rotate relative to each other around pivot point 224.

The first end of the lower landing gear leg 220 is a wheel axle mounting point 220, and a wheel 228 mounted on an axle is shown attached to said mounting point. There is also a second wheel on the same axle, behind the wheel visible in FIG. 4a.

The second end of the lower landing gear leg 222 is pivotally connected to main brace member 226. The main brace member 226 pivotally connects the second end of the lower landing gear leg 222 to the upper landing gear leg 210. Thus, main brace member 226 indirectly connects the upper landing gear leg 210 and lower landing gear leg 212.

A pair of hydraulic cylinders 230 (only one of which can be seen in this figure) has a first end 232 that is pivotally mounted towards axle mounting point 220 of the lower landing gear leg 212. Each of the hydraulic cylinder 230s has a second end 234 that is pivotally mounted to the main brace member 226, and is thus indirectly mounted to the upper landing gear leg 212.

FIG. 4b shows the landing gear 201 in a second configuration 201b. In this configuration, the axle mounting point 220 and the upper end 214 of the upper landing gear 210 are in a different position relative to each other. In this configuration, the distance between the axle mounting point 220 and the upper end 214 of the upper landing gear leg 210 is larger than the distance between the axle mounting point 220 and the upper end 214 of the upper landing gear leg 210 in the first configuration 201a.

An extended telescopic arm 231 extends from each of the hydraulic cylinders 230, when the hydraulic cylinders 230 are in an actuated state (i.e. configured for the second configuration 201b). The hydraulic cylinder 230 is therefore formed of two sections. It is the extension of the telescopic arm 231 that causes the distance between the first end 232 and the second end 234 of each of the hydraulic cylinders 230 to be longer than the distance between the first end 232 and the second end 234 of each of the hydraulic cylinders 230 in configuration 201a.

Three telescopic parts 218a, 218b and 218c of the extendible mechanism 218 are shown to extend from the upper landing gear leg 210. Thus, in the second configuration 201b, the distance between the upper end 214 of the upper landing gear leg 210, and the second end 216 of the upper landing gear leg 210 is lengthened compared to the distance between the upper end 214 of the upper landing gear leg 210, and the second end 216 of the upper landing gear leg 210 in the first configuration 201a.

Figure 6:
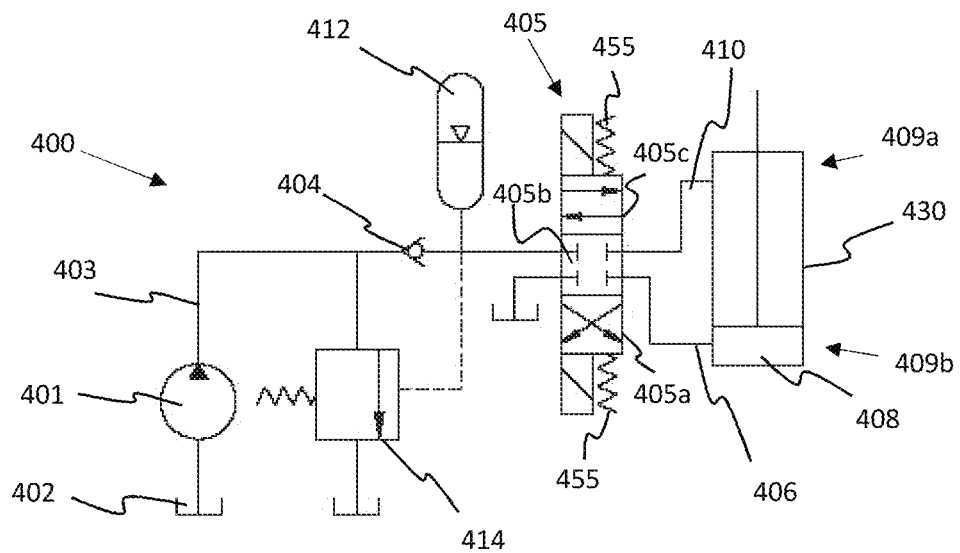
FIG. 6 shows a schematic diagram of a fluid pressurisation system 400, for use with the nose landing gears and aircraft of the first and second embodiments.

The hydraulic cylinders 230 are connected to a fluid pressurisation system (as shown in FIG. 6).

FIG. 4c shows the landing gear 201 in its stowed configuration 201c. The majority of the components of the landing gear 201 are in the same relative positions to each other that they would be in when in the second configuration 201b, however the aircraft landing gear stowage mechanism 236 is arranged differently. When the landing gear is in its stowed configuration 201c (i.e. after the stowage mechanism 236 has been folded), the distance between the distal end 246 of the dragstay upper lever 244 and the bracket 217 is shortened compared to the first configuration 201a or the second configuration 201b. In this configuration, dragstay lower lever 238 is substantially non-parallel with dragstay upper lever 244 and lockstay upper lever 240 is substantially non-parallel with lockstay lower lever 242. The landing gear does not extend below the underside 205 of the aircraft fuselage. Thus, the landing gear may be stored within a bay (not shown, but positioned above the underside 205 of the aircraft fuselage).

Figure 5:
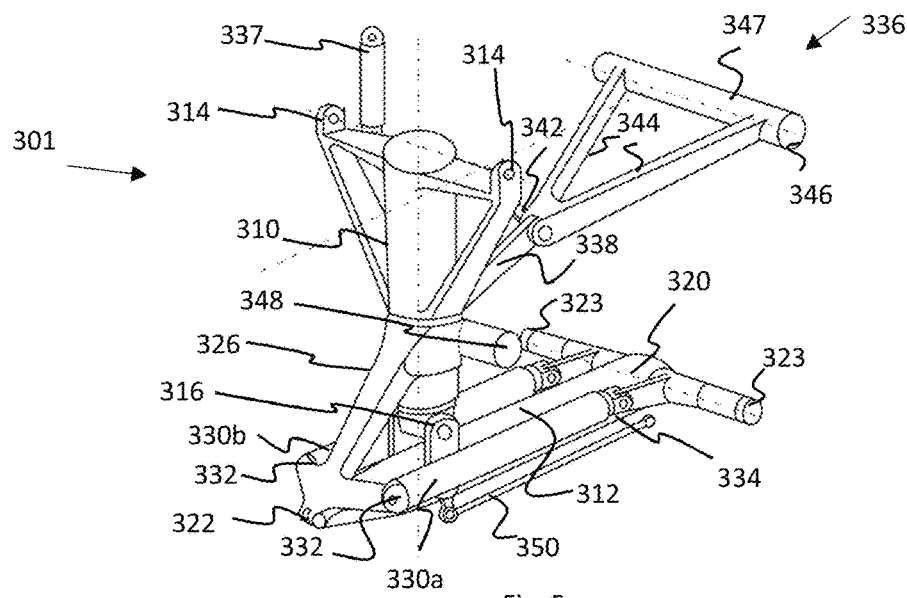
FIG. 5 shows an isometric view of a landing gear according to a second embodiment of the invention, where the landing gear is in a retracted position.

FIG. 5 shows perspective view of a nose landing gear in accordance with a second embodiment of the invention. FIG. 5 shows the landing gear of the second embodiment which is similar to the landing gear of the first embodiment and the same reference numerals are used to refer to like or similar elements, with the replacement of a preceding "2", with a "3". Only parts of the landing gear which differ, or require describing in more detail will now be described.

The landing gear 301 has an upper landing gear leg 310, with two attachment points 314 for attaching to the aircraft. A main brace member 326 is directly attached to the upper landing gear leg 310. A dragstay lower lever 338 of the extension mechanism 336 is directly attached to the upper landing gear leg 310. A dragstay upper lever 344 of the extension mechanism has two arms, which extend to a distal end 346, which has a crossbar 347 between the two arms.

The lockstay lower lever 342 is also shown attached to both the dragstay upper lever 338 and the dragstay upper lever 344. The lockstay upper lever is not visible in this perspective view.

The extension mechanism 336 allows the landing gear to be drawn into a bay (not shown) of the aircraft. The landing gear is drawn into the aircraft by a force being applied to a retraction actuator 337.

The landing gear 301 has a lower landing gear leg 312, with a first end 320 that is at a distal end and a second end 322 that is pivotally attached to the brace member 326. There are two wheel axle mounting points 323, which are located at the second end 322 of the lower landing gear leg.

There are two hydraulic cylinders 330a 330b that span the length of the lower landing gear leg 312, a first hydraulic cylinders 330a positioned along one side of the length of the lower landing gear leg 312, and a second hydraulic cylinder 330b positioned along the other side of the length of the lower landing gear leg 312. The hydraulic cylinders 330a, 330b each have a first end 332 that is mounted on the brace member 326. Each hydraulic cylinder 330a, 330b has a second end 334 that is pivotally mounted at the first end 320 of the lower landing gear leg 312 at the point where an axle mounting point 323 meets the first end 320 of the lower leg of the landing gear.

A steering rack 348 is fixedly mounted to the upper landing gear leg 310 in order to provide "rack and pinion" style steering system to the wheel (not shown). The pinion is also not shown, however such steering systems are well known to the person skilled in the art, and they would have no difficulty in implementing such a system on the landing gear 301, given the location of the rack 348.

A braking line 350 is pivotally attached to the telescopic second end 316 of the upper landing gear leg 310. The braking line 350 is capable of braking a wheel (not shown) attached to axle mounting point 323. There is a braking line present on the far side of the landing gear 300 (not shown in this perspective view) that is capable of braking a wheel on the other axle mounting point 323.

FIG. 6 shows a schematic diagram of a hydraulic pressurisation system 400 for use with the nose landing gears and aircraft of the first and second embodiments.

The hydraulic pressurisation system 400, forming a hydraulic circuit, has a pump 401 for pumping hydraulic fluid, drawn from a hydraulic fluid reservoir 410 along a first set of hydraulic lines 403. When the pump 401 is active, its draws hydraulic fluid from the reservoir 402, such that the hydraulic fluid passes along the hydraulic lines 403 and through the one-way valve 404. The hydraulic fluid then continues to pass along the hydraulic lines 403 until it reaches control valve 405. The control valve 405 has three valve portions, a pressurisation valve portion 405a, a locking valve portion 405b and a release valve portion 405c. Each valve portion corresponds to a respective state of the hydraulic pressurisation system 400. Transition between the aforementioned states is controlled by an actuation system (not shown) which makes the valve move between the respective valve portions (i.e. as shown on this schematic, the actuation system moves the valve either up or down, depending on the state desired, this changing which valve portion is part of the hydraulic circuit). Thus, the state that the valve is in is determined by the position of the relevant valve portions 405a, 405b, 405c. A pair of springs 455 help to bias the valve to towards a middle position (i.e towards the locking valve portion 405b).

When the control valve 405 is set to the pressurisation valve portion 405a, the hydraulic circuit of the hydraulic pressurisation system 400 is completed, such that hydraulic fluid passes along a second set of hydraulic lines 406, into a hydraulic cylinder 430 (which is the inside of hydraulic cylinder 230), such that it enters the hydraulic cylinder 430 at a second location 409*b*. Hydraulic fluid (as a result of the increase in pressure in the cylinder) also flows out of the hydraulic cylinder along a third set of hydraulic lines 410, such that the fluid leaves the hydraulic cylinder 430 at a first location 409*a*. This effectively causes a pressure gradient, where the first location 409*a* is a region of low pressure within the hydraulic cylinder 430, and the second location 409*b* is in a region of high pressure within the hydraulic cylinder 430. This causes the piston 408 held within the hydraulic cylinder 430 to move towards the first location 409*a* within the hydraulic cylinder 430. Thus, this causes telescopic apparatus (not shown) that is attached to the hydraulic cylinder 430 to lengthen.

When the control valve 405 is set to the locking valve portion 405*b*, the hydraulic circuit of the hydraulic pressurisation system 400 is disconnected. This causes the piston 408 within the hydraulic cylinder 430 to be held in its present location. For example, if the locking valve portion 405*b* is selected after hydraulic pressurisation system 400 has been in the pressurisation state, i.e. the locking portion of the valve is lined up with the hydraulic lines, the piston 408 is held at the first location 409*a* within the hydraulic cylinder 430.

When the control valve 405 is set to the release valve portion 405*c*, the hydraulic circuit of the hydraulic pressurisation system 400 is completed such that hydraulic fluid passes along the third set of hydraulic lines 410, into hydraulic cylinder 430 such that it enters the hydraulic cylinder 430 at a first location 409*a*. Hydraulic fluid also flows out of the hydraulic cylinder along the second set of hydraulic lines 406 such that the fluid leaves the hydraulic cylinder 430 at a second location 409*b*. This effectively causes a pressure gradient, where the first location 409*a* is a region of high pressure within the hydraulic cylinder 430, and the first location 409*a* is in a region of low pressure within the hydraulic cylinder 430. Being in the release state causes the piston 408 held within the hydraulic cylinder 430 to move towards the second location 409*b* within the hydraulic cylinder 430. This causes telescopic apparatus (not shown) that is attached to the hydraulic cylinder 430 to shorten.

If the locking valve portion 405*b* is selected after the release valve portion 405*c*, the piston 408 is held at the second location 409*b* within the hydraulic cylinder 430. This is configuration of the hydraulic pressurisation system 400 as shown in FIG. 6.

The fluid pressurisation system 400 also has a hydraulic accumulator 412 and a pressure release valve 414, which together act to keep the pressure in the hydraulic pressurisation system 400 within a safe and operable range. The pressure release valve 414 is opened as part of the release state.

Figure 7:
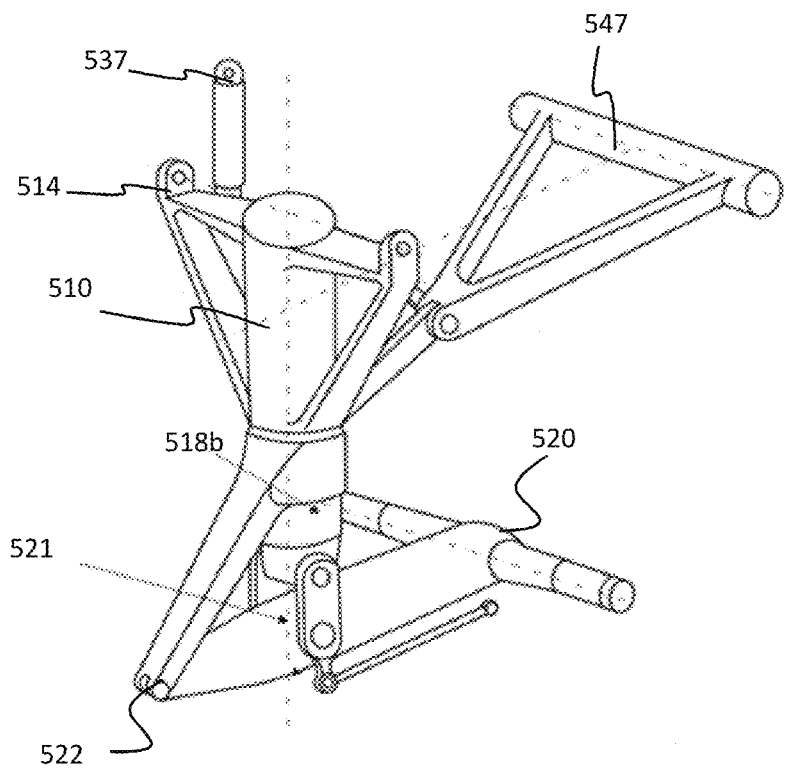
FIG. 7 shows a perspective view of a main landing gear, for use for use with the nose landing gears and aircraft of the first and second embodiments.

FIG. 7 shows a perspective view of a main landing gear for use for use with the nose landing gears and aircraft of the first and second embodiments of the invention. The main landing gear is similar to the nose landing gear of the second embodiment and the same reference numerals are used to refer to like or similar elements, with the replacement of a preceding "3" with a "5". Only the differences from the second embodiment, or elements obscured in the view of FIG. 5, will now be described.

FIG. 7 shows a landing gear similar to landing gear 301, although there are no hydraulic cylinders 330*a*, 330*b* present on landing gear 501. Telescopic part 518*c* is a shock absorber. At the end of the telescopic part 518*c* is kinetic shock absorber 521. Identical parts are also present on the nose landing gear 301 but are not labelled there because they are obscured by the hydraulic cylinder apparatus. Many other parts of the main landing gear 501 are also common with the nose landing gear, for example, the first end 514 of the upper landing gear leg 510, the retraction actuator 537, and the crossbar 547, amongst other parts.

The landing gear 201, of the first embodiment and the hydraulic pressurisation system 400 will now be described in use on an aircraft 200. The method of use also applies to the landing gear 301 of the second embodiment. The method of the use of the landing gear 201, 301 will be described in seven steps of a flight cycle, as follows:

Step 1) Prior to take-off, the landing gear 201 is in the first configuration 201*a* shown in FIG. 4*a*. It is in this position because hydraulic cylinders 230 (one either side of the lower landing gear leg 212—see for example 330 of FIG. 5) have retracted from a previous flight cycle.

Step 2) The control valve 404 is moved from a release valve portion 405*c* (released) to a pressurisation valve portion 405*a* (i.e. into a pressurised state), but the hydraulic cylinders 230 cannot extend because they do not exert enough force to lift the aircraft 200 that the landing gear is attached to, to allow the lower landing gear leg 212 to rotate downwards. The hydraulic cylinder 230 is now pressurised and is exerting a rotating urging force on the upper landing gear leg, which results in an upwards force on the underside 205 of the aircraft fuselage. There is now no need for any active control (e.g. from a pilot, or computer system or the like) to of the control valve 405 until after take-off.

Step 3) Once the aircraft 200 starts to take-off and elevators 208 are rotated to give upwards pitch moment, the aircraft 200 at the nose landing gear 201 lifts and this allows the lower landing gear leg 212 to rotate to position in FIG. 4*b*. The lower landing gear 212 is urged to rotate in this way by the pressurisation of the hydraulic cylinder 230 and provides additional pitch moment for aircraft. At same time, as nose lifts up, the upper landing gear 210 leg extends through lengthening of extension mechanism 218. The pressurisation of hydraulic cylinder 230 provides a biasing force to urge the axle mounting point 220 away from its upper end 214 of the upper landing gear leg 210, which is where the landing gear is attached to the fuselage 205 of the aircraft to which the landing gear 201 is affixed. Thus, such an action lengthens the landing gear 210 between the wheel 228 and the underside 205 of the fuselage aircraft. Such an action moves the landing gear 210 from the first configuration 201*a*, to the second configuration 201*b*. Throughout such a movement, the distance between the axle mounting point 220 and the upper end 214 of the upper landing gear 210 increases. In doing so, this causes the upper end 214 of the first leg of the aircraft 210 to lift relative to the ground 20. The upper landing gear leg 210 is attached to the fuselage 205 at its upper end 214, so such a lifting action causes the part of the aircraft to which the landing gear is attached to lift, relative to the ground 20.

Step 4) Once in air, control valve 405 is moved to locking valve portion 405*b*. The landing gear 201 is thereafter locked in a lengthened position. The landing gear can then be stowed through the use of the stowage mechanism 236. It is then held in a bay, within the aircraft 200, above the underside 205 of the aircraft fuselage.

Step 5) When the aircraft begins a landing procedure, the stowage mechanism 236 is used to lower the landing gear 201 from the bay, such that the landing gear is held below the underside 205 of the aircraft fuselage. The control valve 405 remains in the second position 405b, and thus the landing gear 201 remains locked in its lengthened positon.

Step 6) As the aircraft 200 lands (i.e. as the aircraft touches down on the ground 20) the control valve being in the locking valve portion 405b holds hydraulic cylinder 230 in an extended position, and thus the landing gear 201b in the second position, such that the near landing gear 201 remains in a lengthened state (i.e. in the second configuration 201b). The higher angle of incidence of the aircraft 200 in relation to the ground 20 causes more of the underside 205 of the fuselage to be oriented towards the direction of travel, thus resulting in higher drag than if the aircraft 200 was not pitched up. Thus, the second configuration 201b has an air braking effect, in an aircraft 200 that is landing.

Step 7) Once the speed reduces below about 50 knots, the control valve 405 is moved to the release valve portion 405c. This causes the hydraulic cylinder 230 to be vented, so there is no biasing on the lower landing gear leg 210. Thus, in the release valve portion 405c the lower landing gear leg 212 is able to rotate and aircraft 200 sinks back down to position of FIG. 3a again. Likewise, the aircraft landing gear 201 sinks back down to the first configuration 201a. This is the state of the aircraft 200 and landing gear 201 at the beginning of step 1). These seven steps are repeated for each flight cycle.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It should be understood that whilst the embodiments described herein refer to a hydraulic cylinder, any other suitable biasing means may be employed, such as springs, a pneumatic cylinder or any combination thereof.

It should be understood that whilst the embodiments described herein refer to a steering rack and a "rack and pinion" style steering system, that any other suitable steering system may be used. For example, the steering system used may include "push pull", "rotary actuator", or "banana link" steering systems, all of which are well known to the person skilled in the art.

Whilst the landing gear is only shown as being in the second configuration while on the ground in the Figures, it should be understood that the landing gear can also be locked into the second configuration during flight, for example, immediately before landing.

It should be understood that whilst the embodiments described herein refer to a main landing gear positioned at 80% along the MAC of an aircraft, it should be appreciated that the main landing gear can be located any position sufficiently aft of the passenger area and/or fuel tanks of the aircraft. For example in some embodiments, on some blended wing body aircraft the main landing gear may be positioned at 70% along the MAC, or 90% along the MAC, if that is appropriate.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft nose landing gear comprising:
 i) a landing gear leg attachable at a first end to an aircraft, and having a second opposite end,
 ii) an axle beam having a landing gear wheel axle mounting point at a first end, having a second opposite end and being rotatably mounted at a pivot point between first and second ends of the axle beam towards the second end of the landing gear leg, such that the axle beam is rotatable with respect to the landing gear leg between:
  a first position, in which the first end of the axle beam is a first distance from the first end of the landing gear leg, and
  a second position, in which the first end of the axle beam is a second distance from the first end of the landing gear leg, the second distance being longer than the first distance,
 and
 iii) a biasing member configured to be able to bias the axle beam towards the second position, wherein the biasing member comprises an elongate member directly connected at a first end to the axle beam and indirectly connected at a second opposite end to the landing gear leg via a brace member extending between the axle beam and the landing gear leg.

2. An aircraft landing gear as claimed in claim 1, wherein the biasing member is biased to extend to increase the distance between a first and a second opposite end of the biasing member and so increase the distance between the first end of the axle beam and the first end of the landing gear leg.

3. An aircraft landing gear as claimed in claim 1, wherein the biasing member is pivotally connected at one or both of the first and second ends.

4. An aircraft landing gear as claimed in claim 1, wherein the brace member is pivotally connected to the axle beam.

5. An aircraft landing gear as claimed in claim 1, wherein the biasing member comprises a telescopic arm with a first section and a second section able to telescope in relation to each other.

6. An aircraft landing gear as claimed in claim 5, wherein the telescopic arm is provided with a fluid pressurisation system for urging telescoping movement of the first and second sections.

7. An aircraft landing gear as claimed in claim 6, wherein the fluid pressurisation system comprises a control valve arrangement with a pressurisation setting in which the first and second sections of the telescopic arm are urged apart to lengthen the arm.

8. An aircraft landing gear as claimed in claim 6, wherein the control valve arrangement has a locking setting in which the relative telescopic position of the first and second sections of the telescopic arm is locked.

9. An aircraft landing gear as claimed in claim 6, wherein the control valve arrangement has a released setting in which there is substantially no biasing of the telescoping movement of the first and second sections of the telescopic arm.

10. An aircraft landing gear as claimed in claim 1, wherein the landing gear leg or the axle beam is telescopic such that it can extend.

11. An aircraft comprising a landing gear as claimed in claim 1.

12. A blended wing body aircraft comprising a landing gear as claimed in claim 1.

13. A blended wing body aircraft as claimed in claim 12, further comprising a main landing gear situated at a position rear of aircraft fuel tanks.

14. A method of operating an aircraft, the aircraft comprising a nose landing gear comprising
- a landing gear leg,
- an axle beam on which are mounted a wheel axle and associated wheel, the axle beam being rotatably mounted on the landing gear leg, and
- an elongate member with a variable length directly connected to the axle beam and indirectly connected to the landing gear leg via a brace member, the method comprising the steps of:

i) while the aircraft is on the ground, moving a control valve arrangement to a pressurised setting to cause, with the use of the elongate member and the brace member, a bias of the landing gear leg away from the axle beam in a direction to extend the height of the landing gear, ii) during take-off, lifting the nose of the aircraft up, the bias thereby automatically causing the landing gear leg to rotate to extend the height of the landing gear as the length of the elongate member varies.

15. A method of operating an aircraft, the aircraft comprising a nose landing gear comprising
- a landing gear leg,
- an axle beam on which are mounted a wheel axle and associated wheel, the axle beam being rotatably mounted on the landing gear leg, and
- an elongate member with a variable length directly connected to the axle beam and indirectly connected to the landing gear leg via a brace member, the method comprising the steps of:

i) while the aircraft is in the air, moving a control valve arrangement to a locked setting, to lock the length of the elongate member, the elongate member and the brace member thus causing the landing gear leg to be locked in a rotation position in which the landing gear height is extended, ii) after landing, moving the control valve arrangement to a released setting, allowing the length of the elongate member to vary and the landing gear leg to rotate to reduce the height of the landing gear.

* * * * *